Patented June 4, 1929.

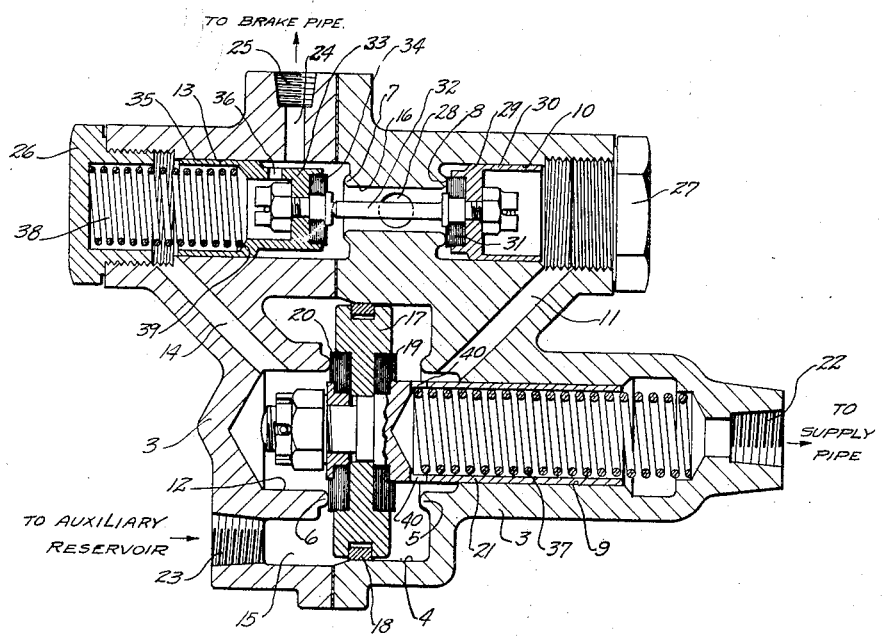

1,716,027

UNITED STATES PATENT OFFICE.

JOHN J. BRINGS, OF SOUTH MILWAUKEE, WISCONSIN, ASSIGNOR TO THE CHRISTENSEN AIR BRAKE COMPANY, OF CLEVELAND, OHIO.

AUTOMATIC VALVE MECHANISM FOR STRAIGHT AND AUTOMATIC AIR BRAKE SYSTEMS.

Application filed July 30, 1927. Serial No. 209,465.

The invention relates to air brake systems for vehicle trains.

The object of the invention is to provide a simple and efficient automatic valve mechanism of the triple valve type for use with the auxiliary reservoir of a straight and automatic air brake system for controlling the passage of compressed air from the auxiliary reservoir and for permitting straight air application.

The invention further consists in the several features hereinafter set forth and more particularly defined by claims at the conclusion hereof.

The drawing shows a vertical sectional view through the automatic valve mechanism embodying the invention.

In the drawing the numeral 3 designates a two-part casing whose parts are suitably secured together and formed to provide a cylinder bore 4, valve seats 5, 6, 7 and 8, bores 9 and 10 adjacent the seats 5 and 8, respectively, connected by a passage 11, bores 12 and 13 adjacent the seats 6 and 7, respectively connected by a passage 14, a chamber 15, and a bore or passage 16 between seats 7 and 8.

A triple valve piston 17 is mounted to reciprocate in the bore 4 and has the usual sealing ring 18 which permits the air to pass by it for the purpose of charging the auxiliary reservoir. This piston has valve disk portions 19 and 20 on opposite sides thereof forming valve heads engageable respectively with the seats 5 and 6 and a hollow tubular rod portion 21 slidably mounted in the bore 9.

The valve 20 may be termed an inlet valve and cooperates with the seat 6 to control the passage of compressed air from the auxiliary reservoir to the brake system of the trailer vehicle on the movement of the piston 17 for automatic brake application. The valve 19 may be termed a shut-off valve and cooperates with the seat 5 to prevent the passage of compressed air from the auxiliary reservoir to bore 4 when the connection with the main reservoir supply is open, as by a separation of the vehicles.

A threaded opening 22 communicates with the bore 9 and connects said bore or passage with a pipe line from the main reservoir on the tractor vehicle. A threaded opening 23 communicates with the chamber 15 and connects said chamber with the auxiliary reservoir of a trailer vehicle. A passage 24 with a threaded end 25 connects the inner end of the bore with the control valve mechanism for the brake cylinders of the trailer vehicle such as, for example, that shown in United States Letters Patents Nos. 1,614,652 and 1,614,653, of January 18, 1927, to Niels A. Christensen. The outer end of the bore 13 is closed off by a box-nut 26 and the outer end of bore 10 is closed off by a similar nut 27. An exhaust opening 28 extends from the passage 16 to atmosphere.

A fluid-pressure-operated relief valve actuator, in the form of a valve 29 having a tubular portion 30 slidably mounted in the bore 10 and a disk head 31 adapted to seat against the seat 8, has a stem 32 extending through the bore 16 and engageable with the head of a relief control valve 33 whose disk head 34 is adapted to seat against the seat 7. This forms, in effect, a fluid-pressure-operated piston and the valve head thereof is used to obviate the necessity for special packing for the piston. This valve 33 has a tubular stem portion 35 slidably mounted in the bore 13 and one or more bleed openings 36 communicating with the space in front of the seat 7 and the passage 25.

A spring 37 may be interposed between the end of the bore 9 and the inner end of the rod 21 to normally urge the piston toward the left to cause disk 20 to seat on seat 6 though the piston will function without such a spring.

A spring 38 may be interposed between the nut 26 and a shoulder 39 on the tubular stem of the valve 33 to normally urge said valve toward its seat 7 but this valve will function without said spring under conditions hereinafter described.

With this construction air from the main reservoir finds its way through the opening 22, hollow stem 21, openings 40 in said stem, into the bore 4 and then past the ring 18 to chamber 15 and thence to the auxiliary reservoir for charging the same and under normal conditions the main reservoir pressure is sufficient to hold the piston in the position shown, closing off communication between the chamber 15 and bore 12 though the spring 37 is used to insure this condition.

The air from the main reservoir also passes from cylinder 4 and passage 11 to the forward end of the bore 10, acting upon the piston or tubular head of the relief valve actuator to hold the sealing member 29 seated and hold valve 33 open against the pressure of its spring 38, if such is used. Under these conditions the passage 24 will communicate with the exhaust 28 so that under normal straight air brake application the release of air from the brake system will take place upon the operation of the control valve (not shown) for straight air brake application.

Should the line connecting the trailer vehicle with the main reservoir be separated the rapid drop of pressure in the chamber formed by the bore 9 and cylinder 4 will cause the pressure of air in the auxiliary reservoir to shift the piston 17 toward the right until the disk 19 seats on seat 5, and there will also be a reduction in pressure against the piston, including the head of the sealing member 29. Under these conditions compressed air from the auxiliary reservoir is then free to pass from chamber 15 to bore 12, passage 14 to the space within the stem 35 and acts in conjunction with the spring 38 to shift the relief valve 33 to a closed position against the seat 7. This then puts the automatic mechanism in condition for automatic brake application since the compressed air then passes from the bleed openings 36 through the chamber formed by the forward end of bore 13 and thence through passage 24 to the brake system, thereby causing an automatic application of the brakes.

The mechanism will function without the aid of the spring 38 so long as the bleed hole or holes is or are sufficiently small to prevent a rapid discharge into the forward end of the bore 13 before the valve 33 has been seated and thereby preventing a discharge of trailer reservoir air pressure through port 28, but the use of the spring 38 is preferred as a quicker action is provided to close the relief valve 33 against the seat 7.

From the foregoing description it will be noted that when the relief valve 33 is open and the triple valve piston 17 is in its normal release position that the mechanism is in position to allow of the exhaust of air from the brake system through the bore 28 but as soon as the reduction in pressure occurs in the chamber formed by the bore 4 the shifting of the piston 17 opens the inlet valve 20 and causes the relief valve 33 to be shifted to cut off the port 28 leading to atmosphere to permit the passage of compressed air under auxiliary pressure to the brake system.

I desire it to be understood that this invention is not to be limited to any particular form or arrangement of parts except in so far as such limitations are specified in the claims.

What I claim as my invention is:

1. In a triple valve mechanism, the combination with a triple valve piston, the auxiliary reservoir, the main reservoir supply pipe and the brake pipe, of a relief port normally in open communication with the brake pipe, a relief valve controlling said port, means operated by the fluid pressure of the supply pipe to normally hold said relief valve open, an inlet valve on said piston controlling the passage of fluid from the auxiliary reservoir to the brake pipe and closed when the piston is in release position, a reduction in pressure in the supply pipe causing the shifting of said piston and the opening of said relief valve and the establishing of communication between said auxiliary reservoir and brake pipe.

2. In a triple valve mechanism, the combination with a triple valve piston, the auxiliary reservoir, the main reservoir supply pipe and the brake pipe of a relief port normally in open communication with the brake pipe, a relief valve controlling said port, means operated by the fluid pressure of the supply pipe to normally hold said relief valve open, an inlet valve on said piston controlling the passage of fluid from the auxiliary reservoir to the brake pipe and closed when the piston is in release position, and a shut-off valve on said piston, a reduction in pressure in the supply pipe causing the shifting of said piston and the opening of said relief valve and the establishing of communication between said auxiliary reservoir and brake pipe and moving said shut-off valve to close off said main reservoir supply pipe.

3. In a triple valve mechanism, the combination with the auxiliary reservoir, the brake pipe and the main reservoir supply pipe, of a triple valve piston having valves on opposite sides respectively controlling the passage of air from the supply pipe to the auxiliary reservoir and from the auxiliary reservoir to the brake pipe, of a relief port in communication with the brake pipe for straight air application, a relief valve controlling said port, fluid-pressure-operated means controlled by said piston for shifting said relief valve to open position and fluid-pressure-operated means controlled by said piston for shifting said relief valve to closed position.

4. In a triple valve mechanism, the combination with the auxiliary reservoir, the brake pipe and the main reservoir supply pipe, of a triple valve piston having valves on opposite sides respectively controlling the passage of air from the supply pipe to the auxiliary reservoir and from the auxiliary reservoir to the brake pipe, of a relief port in communication with the brake pipe for straight air application, a spring-closed relief valve controlling said port, and fluid-pressure-operated means for holding said relief valve in open position when said piston is in release position.

5. In a triple valve mechanism, the combination with a casing having connection with the auxiliary reservoir, the brake pipe and the main reservoir supply pipe, of a triple valve piston having valves on opposite sides respectively controlling the passage of air from the supply pipe to the auxiliary reservoir and from the auxiliary reservoir to the brake pipe, of a relief port in said casing in communication with the brake pipe for straight air brake application, a relief valve controlling said port having a tubular stem portion slidably mounted in a bore in said casing and with a restricted discharge from the interior of said stem to the space in communication with said brake pipe, the space within said stem being subjected to air at auxiliary reservoir pressure and acting to shift said relief valve to closed position when said piston moves from its release position, and fluid-pressure-operated means acting to hold said relief valve open when said piston is in release position.

6. In a triple valve mechanism, the combination with a casing having connection with the auxiliary reservoir, the brake pipe and the main reservoir supply pipe, of a triple valve piston having valves on opposite sides respectively controlling the passage of air from the supply pipe to the auxiliary reservoir and from the auxiliary reservoir to the brake pipe, of a relief port in said casing in communication with the brake pipe for straight air brake application, a relief valve controlling said port, and a relief-valve-actuating piston operated by the pressure in the supply pipe for moving said relief valve to open position with the triple valve piston in release position, said relief valve piston having a sealing member associated therewith.

In testimony whereof, I affix my signature.

JOHN J. BRINGS.